United States Patent

[11] 3,622,667

[72] Inventors Sidney B. Richter
Chicago;
Ephraim H. Kaplan, Skokie, both of Ill.
[21] Appl. No. 799,115
[22] Filed Feb. 13, 1969
[45] Patented Nov. 23, 1971
[73] Assignee Velsicol Chemical Corporation
Chicago, Ill.

[54] NEW NEMATOCIDAL COMPOSITIONS
8 Claims, No Drawings
[52] U.S. Cl. ..................................................... 424/211
[51] Int. Cl. ..................................................... A01n 9/36
[50] Field of Search............................................ 424/211;
260/944

[56] References Cited
UNITED STATES PATENTS
3,053,876  9/1962  Malz et al. ..................... 424/211
3,342,905  9/1967  Richter........................... 424/211

*Primary Examiner*—Albert T. Meyers
*Assistant Examiner*—Norman A. Drezin
*Attorney*—Robert J. Schwarz ABSTRACT: This invention discloses nematocidal compositions comprising an inert carrier and, as an essential active ingredient, in a quantity toxic to nematodes, a compound of the formula

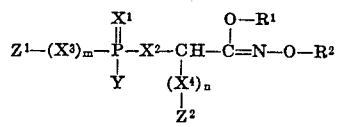

wherein $R^1$ and $R^2$ are alkyl; $X^1$, $X^2$, $X^3$ and $X^4$ are independently selected from the group consisting of oxygen and sulfur; $m$ and $n$ are each integers from 0 to 1; $Z^1$ is selected from the group consisting of alkyl, alkenyl and

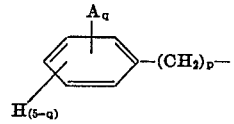

wherein A is selected from the group consisting of alkyl, alkenyl, alkoxy, alkylthio, halogen, nitro, alkylsulfoxide, alkylsulfone and dialkylamino, $q$ is an integer from 0 to 5, and $p$ is an integer from 0 to 3; $Z^2$ is selected from the group consisting of hydrogen and $Z^1$, provided that when $Z^2$ is hydrogen then $n$ is 0; and Y is selected from the group consisting of alkyl, alkenyl, alkoxy, alkylthio, amino, alkylamino, dialkylamino and

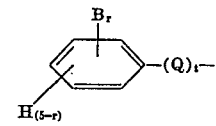

wherein B is selected from the group consisting of alkyl, alkenyl, alkoxy, alkylthio, halogen, nitro, alkylsulfoxide, alkylsulfone and dialkylamino, $r$ is an integer from 0 to 5, Q is selected from the group consisting of oxygen, sulfur, alkylene, alkyleneoxy and alkylenethio, and $t$ is an integer from 0 to 1. This invention further discloses a method for control of nematodes which comprises contacting said nematodes with a nematocidal composition comprising a inert carrier and, in a quantity toxic to nematodes, a compound as described above.

NEW NEMATOCIDAL COMPOSITIONS

This invention relates to new pesticidal compositions and more particularly relates to nematocidal compositions comprising an inert carrier and, as an essential active ingredient, in a quantity toxic to nematodes, a compound of the formula

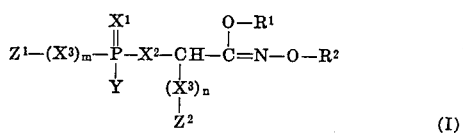

(I)

wherein $R^1$ and $R^2$ are alkyl; $X^1$, $X^2$, $X^3$ and $X^4$ are independently selected from the group consisting of oxygen and sulfur; $m$ and $n$ are each integers from 0 to 1; $Z^1$ is selected from the group consisting of alkyl, alkenyl and

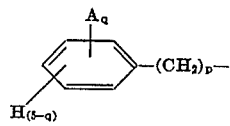

wherein A is selected from the group consisting of alkyl, alkenyl, alkoxy, alkylthio, halogen, nitro, alkylsulfoxide, alkylsulfone and dialkylamino, $q$ is an integer from 0 to 5, and $p$ is an integer from 0 to 3; $Z^2$ is selected from the group consisting of hydrogen and $Z^1$, provided that when $Z^2$ is hydrogen then $n$ is 0; and Y is selected from the group consisting of alkyl, alkenyl, alkoxy, alkylthio, amino, alkylamino, dialkylamino and

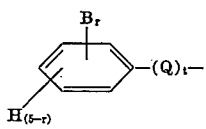

wherein B is selected from the group consisting of alkyl, alkenyl, alkoxy, alkylthio, halogen, nitro, alkylsulfoxide, alkylsulfone and dialkylamino, $r$ is an integer from 0 to 5, Q is selected from the group consisting of oxygen, sulfur, alkylene, alkyleneoxy and alkylenethio, and $t$ is an integer from 0 to 1.

This invention further relates to a method of controlling nematodes which comprises contacting said nematodes with a nematocidal composition as described above.

In a preferred embodiment of the present invention the nematocidally active compounds of formula I have substituents as follows: $R^1$ and $R^2$ are lower alkyl; $X^1$, $X^2$, $X^3$ and $X^4$ are independently selected from the group consisting of oxygen and sulfur; $m$ and $n$ are each integers from 0 to 1; $Z^1$ is selected from the group consisting of lower alkyl, lower alkenyl and

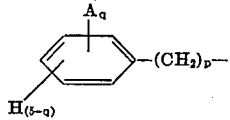

wherein A is selected from the group consisting of lower alkyl, lower alkenyl, lower alkoxy, lower alkylthio, chlorine, bromine, nitro and di(lower alkyl)amino, $q$ is an integer from 0 to 3, and $p$ is an integer from 0 to 3; $Z^2$ is selected from the group consisting of hydrogen and the preferred $Z^1$, provided that when $Z^2$ is hydrogen then $n$ is 0; and Y is selected from the group consisting of lower alkyl, lower alkenyl, lower alkoxy, lower alkylthio, amino, lower alkylamino, di(lower alkyl)amino and

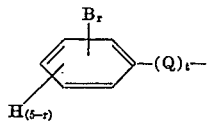

wherein B is selected from the group consisting of lower alkyl, lower alkenyl, lower alkoxy, lower alkylthio, chlorine, bromine, nitro and di(lower alkyl)amino, $r$ is an integer from 0 to 3, Q is selected from the group consisting of oxygen, sulfur, lower alkylene, lower alkyleneoxy and lower alkylenethio, and $t$ is an integer from 0 to 1.

The nematocidally active compounds of the present invention can be readily prepared from compounds of the formula

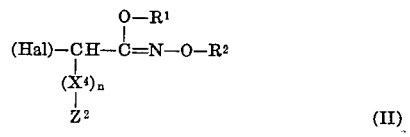

(II)

wherein Hal designates halogen, preferably chlorine or bromine, and $R^1$, $R^2$, $X^4$, $Z^2$ and $n$ are as heretofore described, by reaction with about an equimolar amount of an alkali metal phosphonamidate, phosphoramidate, phosphate, phosphonate, or phosphinate of the formula

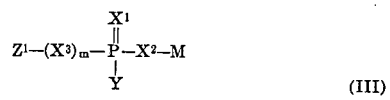

(III)

wherein M is an alkali metal and $X^1$, $X^2$, $X^3$, $Z^1$, Y and $m$ are as heretofore described. This reaction can be effected by heating the reactants in an inert organic solvent such as methyl ethyl ketone at the reflux temperature of the reaction mixture for a period of from about 4 to about 24 hours. After the reaction is completed the reaction mixture can be filtered to remove the alkali metal halide which has formed. The desired product can then be conveniently recovered as a residue upon evaporation of the solvent from the remaining solution. The product can then be used as such or can be further purified by washing, distillation or chromatography if the product is an oil, or by trituration, recrystallization or other common methods well known in the art if the product is a solid.

The compounds of formula II can be prepared from a compound of the formula

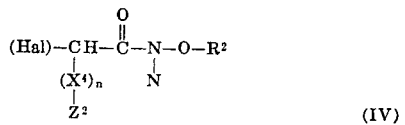

(IV)

wherein Hal stands for halogen, such as chlorine or bromine, and $R^2$, $X^4$, $Z^2$ and $n$ are as heretofore described, by reaction with a diazoalkane. This reaction can be effected by slowly adding a solution of the alkoxyacetamide of formula IV with stirring to a slight molar excess of a solution of the diazoalkane at a temperature below about 15° C. and preferably at a temperature of from about −10° to about 10° C. Suitable solvents for the reactants are inert organic solvents such as ether, benzene or ether-ethanol mixtures, and the like. After the addition is completed stirring can be continued for a short period to insure completion of the reaction. The desired product can then be recovered by evaporation of the solvents used and can then be used as such or can be further purified by conventional techniques well known in the art.

Exemplary diazoalkanes suitable for reaction with compounds of formula IV to form the compound of formula II are diazomethane, diazoethane, diazo-n-propane, diazo-isobutane, diazo-n-butane, diazo-n-pentane, diazo-n-hexane, diazo-n-octane, and the like.

Exemplary suitable compounds of formula IV for preparing the compounds of formula II are N-methoxy-α-chloroacetamide, N-ethoxy-α-chloroacetamide, N-isopropoxy-α-chloroacetamide, N-n-propoxy-α-bromoacetamide, N-butoxy-α-chloroacetamide, n-nonoxy-α-chloroacetamide, N-methoxy-α-chloropropionamide, N-methoxy-α-chloro-n-butyramide, N-ethoxy-α-chloroisobutyramide, N-methoxy-α-chloro-n-valeramide, N-isopropoxy-α-chloro-n-caproamide, N-methoxy-α-phenyl-α-chloroacetamide, N-methoxy-α-(4-chlorophenyl)-α-chloroacetamide, N-methoxy-α-(2-methyl-4

-chlorophenyl)-α-chloroacetamide, N-ethoxy-α-(3-nitrophenyl)-α-chloroacetamide, N-methoxy-α-(3-dimethylaminophenyl)-α-chloroacetamide, N-ethoxy-α-(2,4-dichlorobenzyl)-α-chloroacetamide, and the like.

The alkali metal phosphonamidates, phosphoramidates, phosphates, phosphonates and phosphinates of formula III which are used in the preparation of the active compounds of the present invention are known in the art and can be prepared by the methods described by Malatesta and Pizzotti, Chimica e Industria (Milan) 27, 6–10(1945,), and Melnikov and Grapov, Zhur. Vsesoyuz Khim. Obschchestva in D.I. Mendeleeva, 6, No. 1; 119–120(1961).

The manner in which the nematocidally active compounds of the present invention can be prepared is more specifically illustrated in the following examples.

EXAMPLE 1

Preparation of 1-Chloro-2-methoxy-imino-2-methoxyethane

Ether (275ml.) was added to a 40 allylphenyl) percent aqueous solution of potassium hydroxide (85 ml.) contained in a 500 ml. Erlenmeyer flask and the resulting mixture was cooled in an ice-salt bath to −5° C. with stirring in the absence of light. N-Nitrosomethylurea (30 grams; 0.29 mol) was added over a period of about 3 minutes with stirring and continued cooling. The ether phase was then decanted into a cooled 1-liter flask and a solution of N-methoxy-chloroacetamide (20 grams; 0.16 mol) in ether and ethyl alcohol was slowly added, with stirring and cooling, over a period of about 2 hours. Stirring and cooling was continued for about 4 hours after the addition was completed. The reaction mixture was then allowed to warm up to room temperature and dried over anhydrous magnesium sulfate. After this time the mixture was filtered and the filtrate was stripped of solvents. The residue was distilled and the fraction boiling between 61° and 70° C. at 20 mm. of Hg pressure was collected to yield 1-chloro-2-methoxyimino-2-methoxyethane.

EXAMPLE 2

Preparation of S-(2-Methoxyimino-2methoxyethyl) O-Ethyl N-Isopropyl-thiolophosphoramidate

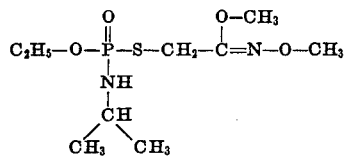

A solution of 1-chloro-2methoxyimino-2-methoxyethane (7 grams; 0.05 mol) in methyl ethyl ketone (100 ml.) was placed in a glass reaction flask equipped with mechanical stirrer and reflux condenser. Potassium O-ethyl N-isopropylthiolophosphoramidate (11 grams; 0.05 mol) was added thereto and the reaction mixture was heated at reflux for a period of about 21 hours with continuous stirring. After this time the reaction mixture was cooled and filtered to remove the potassium chloride which had formed. The filtered solution was then stripped of solvent in a rotary evaporator and the resulting product was chromatographed in a 37-inch-long column of 1-inch diameter utilizing florex (300 grams) as the adsorbent and various mixtures of pentane, ether and acetone as the eluants. Thirty-one fractions were collected of which the first two were discarded. Eluates 3 to 30, which were eluted with pentane-ether mixtures, were combined and evaporated and eluate 31, which was eluted with acetone, was evaporated to yield S-(2-methoxyimino-2-methoxyethyl) O-ethyl N-isopropylthiolophosphoramidate. The product of eluate 31 had a refractive index of 1.4902 at 25° C. and the following elemental analysis as calculated for $C_9H_{21}N_2O_4PS$:

|  | N | P | S |
|---|---|---|---|
| Theoretical % | 9.9 | 10.9 | 11.3 |
| Found % | 9.68 | 10.54 | 11.13 |

EXAMPLE 3

Preparation of 1-Chloro-2-methoxy-imino-2-ethoxyethane

Ether (275 ml.) was added to a 40 percent aqueous solution of potassium hydroxide (85 ml.) and the resulting mixture was stirred and cooled to about −5° C. in the absence of light. N-Nitrosoethylurea (35.5 grams; 0.29 mol) was slowly added over a period of about 10 minutes with stirring and continued cooling. The ether phase was then decanted into a precooled 1-liter flask and a solution of N-methoxy-α-chloroacetamide (20 grams; 0.16 mol) in an ethanol-ether mixture (200 ml.) was slowly added over a period of about 95 minutes. Stirring and cooling was continued for a period of about 1 hour after the addition was completed. After this time the reaction mixture was allowed to warm up to room temperature and was dried over anhydrous magnesium sulfate. The dried solution was filtered and then stripped of solvents. The residue was distilled in vacuo to yield 1-chloro-2-methoxyimino-2-ethoxyethane having a boiling point of 53° C. at 18 mm. Hg pressure and having the following elemental analysis as calculated for $C_5H_{10}ClNO_2$:

|  | C | H | CL |
|---|---|---|---|
| Theoretical % | 39.6 | 6.6 | 23.4 |
| Found % | 39.44 | 6.62 | 23.44 |

EXAMPLE 4

Preparation of S-(2-Methoxyimino-2-ethoxyethyl) O-Ethyl N-Isopropyl-thiolophosphoramidate

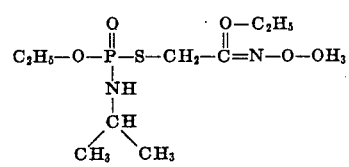

1-Chloro-2-methoxyimino-2-ethoxyethane(4.5 grams; 0.03 mol), potassium O-ethyl N-isopropylthiolophosphoramidate (6.5 grams; 0.03 mol) and methyl ethyl ketone (100 ml.) were charged into a glass reaction flask equipped with stirrer and reflux condenser. The reaction mixture was heated at reflux for a period of about 16 hours with continuous stirring. After this time the reaction mixture was cooled and filtered to remove the potassium chloride which had formed. The filtered solution was then evaporated under reduced pressure and the residue dissolved in an ether-methylene chloride mixture. The resulting solution was washed with water and was dried over anhydrous magnesium sulfate and filtered. The filtered solution was then stripped of solvents under reduced pressure to yield S-(2-methoxyimino-2-ethoxyethyl) O-ethyl N-isopropylthiolophosphoramidate having a refractive index of 1.4790 at 23° C. and having the following elemental analysis as calculated for $C_{10}H_{23}N_2O_4PS$:

|  | C | PH | S |
|---|---|---|---|
| Theoretical % | 40.3 | 7.8 | 10.4 | 10.7 |
| Found % | 39.99 | 7.69 | 10.72 | 10.77 |

EXAMPLE 5

Preparation of O-(2-Methoxyimino-2-methoxyethyl) O-Methyl N,N-Dimethylphosphoramidate

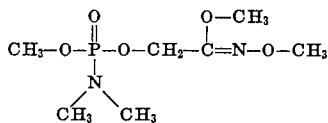

A solution of 1-chloro-2-methoxyimino-2-methoxy-ethane (7 grams; 0.05 mol) in methyl ethyl ketone (100 ml.) is placed into a glass reaction flask equipped with a mechanical stirrer and reflux condenser. Potassium O-methyl N,N-dimethylphosphoramidate (8.9 grams; 0.05 mol) is added and the reaction mixture is heated at reflux with stirring, for a period of about 18 hours. After this time the reaction mixture is cooled and filtered to remove the potassium chloride which is formed. The filtered solution is then stripped of solvent under reduced pressure and the residue is redissolved in an ether-methylene chloride mixture. The resulting solution is washed with water and dried over anhydrous magnesium sulfate. The dried solution is then filtered and evaporated to yield O-(2-methoxyimino-2-methoxyethyl) O-methyl N,N-dimethylphosphoramidate.

EXAMPLE 6

Preparation of 1-Chloro-2-n-butoxy-imino-2-ethoxyethane

A freshly prepared solution of diazoethane (6 grams; 0.1 mol) in either (100 ml.) is charged into a liter glass reaction flask equipped with a magnetic stirrer and is cooled to a temperature of about 5° C. A solution of N-n-butoxy-α-chloroacetamide (17 grams; 0.1 mol) in a 1:1 mixture of ethanol and ether (200 ml.) is then slowly added to the flask, with continuous stirring and cooling, over a period of about 1 hour. After the addition is completed stirring is continued for about 2 hours. After this time the mixture is filtered and the filtrate is stripped of solvents under reduced pressure to yield 1-chloro-2-n-butoxyimino-2-ethoxyethane as a residue.

EXAMPLE 7

Preparation of O-(2-n-Butoxyimino-2-ethoxyethyl) O-(4-Chlorophenyl) N,N-diethylphosphoramidate

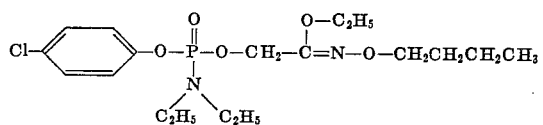

A solution of 1-chloro-2-n-butoxyimino-2-ethoxyethane (9.7 grams; 0.05 mol) in methyl ethyl ketone (100 ml.) is placed into a glass reaction flask equipped with a mechanical stirrer and reflux condenser. Potassium O-(4-chlorophenyl) N,N-diethylphosphoramidate (15 grams; 0.05 mol) is added and the reaction mixture is heated at reflux, with stirring, for a period of about 18 hours. After this time the reaction mixture is cooled and filtered to remove the potassium chloride which has formed. The filtered solution is then is then stripped of solvent under reduced pressure and the residue is redissolved in an ether-methylene chloride mixture. The resulting solution is washed with water and is dried over anhydrous magnesium sulfate. The dried solution is then filtered and evaporated to yield O-(2-n-butoxylimino-2-ethoxyethyl) O-(4-chlorophenyl) N,N-diethylphosphoramidate.

EXAMPLE 8

Preparation of 1-Chloro-2-isopropoxy-imino-2-methoxyethane

A freshly prepared solution of diazomethane (4.2 grams; 0.1 mol) in ether (100 ml.) is placed into a 1-liter glass reaction vessel equipped with a magnetic stirrer and is cooled to a temperature of about 0° C. A solution of N-isopropoxy-α-chloroacetamide (15.2 grams; 0.1 mol) in a 1:1 mixture of ethanol and ether (200 ml.) is then added to the reaction vessel, with continuous stirring and cooling, over a period of about 2 hours. Stirring is continued for a further period of about 3 hours after the addition is completed. After this time the mixture is filtered and the filtrate is stripped of solvents under reduced pressure to yield 1-chloro-2-isopropoxyimino-2-methoxyethane as a residue.

EXAMPLE 9

Preparation of O-(2-Isopropoxyimino-2-methoxyethyl) S-(3-Methylphenyl) N-n-propylthiolophosphoramidate

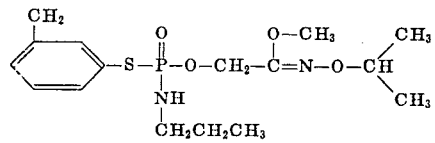

A solution of 1-chloro-2-isopropoxyimino-2-methoxyethane (8.5 grams; 0.05 mol) in methyl ethyl ketone (100 ml.) is placed into a glass reaction flask equipped with a mechanical stirrer and reflux condenser. Potassium S-(3-methylphenyl) N-n-propylthiolophosphoramidate (11.9 grams; 0.05 mol) is added to the flask and the reaction mixture is heated at reflux for a period of about 12 hours. After this time the mixture is cooled and filtered to remove the potassium chloride which has formed. The filtered solution is then stripped of solvent under reduced pressure and the residue is redissolved in an ether-methylene chloride mixture. The resulting solution is washed with water and dried over anhydrous magnesium sulfate. The dried solution is filtered and stripped of solvent under reduced pressure to yield O-(2-isopropoxyimino-2-methoxyethyl) S-(3-methylphenyl) N-n-propylthiolophosphoramidate as a residue.

EXAMPLE 10

Preparation of 1-Methoxyimino-1-methoxy-2-chloropropane

Ether (275 ml.) is added to a 40 percent aqueous solution of potassium hydroxide (85 ml.) contained in a 500 ml. Erlenmeyer flask and the resulting mixture is cooled in an ice-salt bath to −5° C., with stirring, in the absence of light. N-Nitrosomethylurea (30 grams; 0.29 mol) is added over a period of about 3 minutes with stirring and continued cooling. The ether phase is then decanted into a cooled 1-liter flask and a solution of N-methoxy-α-chloropropionamide (21 grams; 0.16 mol) in ether and ethyl alcohol is slowly added, with stirring and cooling, over a period of about 2 hours. Stirring and cooling is continued for about 4 hours after the addition is completed. The reaction mixture is then allowed to warm up to room temperature, dried over magnesium sulfate and filtered. The filtrate is stripped of solvents to yield 1-methoxyimino-1-methoxy-2-chloropropane.

EXAMPLE 11

Preparation of S-(1-Methyl-2-methoxy-imino-2-methoxyethyl) O-Ethyl N-Isopropylthiolophosphoramidate

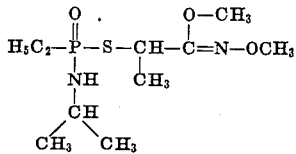

A solution of 1-methoxyimino-1-methoxy-2-chloropropane (7.6 grams; 0.05 mol) in methyl ethyl ketone (100 ml.) is charged into a glass reaction flask equipped with a mechanical stirrer and reflux condenser. Potassium O-ethyl N-isopropylthiolophosphoramidate (11 grams; 0.05 mol) is added thereto and the reaction mixture is heated at reflux for a period of about 18 hours with continuous stirring. After this time the reaction mixture is cooled and filtered to remove the potassium chloride that has formed. The filtered solution is then stripped of solvent to yield S-(1-methyl-2-methoxyimino-2-methoxyethyl) O-ethyl N-isopropylthiolophosphoramidate as a residue.

EXAMPLE 12

Preparation of 1-Methoxyimino-1-methoxy-2-phenyl-2-chloroethane

A newly prepared solution of diazomethane (8.4 grams; 0.2 mol) in ether (100 ml.) is placed in a 1-liter glass reaction flask equipped with a magnetic stirrer, and is cooled to a temperature of about 5° C. A solution of N-methoxy-α-phenyl-αchloroacetamide (11 grams; 0.1 mol) in ether (150 ml.) is then added to the reaction flask, with continuous stirring and cooling, over a period of about 1 hour. After the addition is completed, stirring is continued for a period of about 2 hours. After this time the reaction mixture is stripped of solvent under reduced pressure to yield 1-methoxyimino-1-methoxy-2-phenyl-2-chloroethane.

EXAMPLE 13

Preparation of O-(1-Phenyl-2-methoxy-imino-2-methoxyethyl) O-Phenyl N-t-Butylphosphoramidate

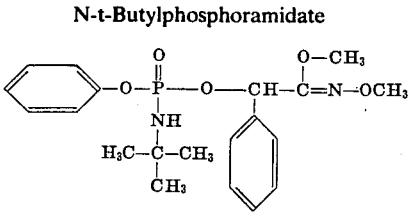

A solution of 1-methoxyimino-1-methoxy-2-phenyl-2-chloroethane (6 grams; 0.05 mol) in methyl ethyl ketone (100 ml.) is charged into a glass reaction vessel equipped with a mechanical stirrer and reflux condenser Potassium O-phenyl N-t-butylphosphoramidate (13.3 grams; 0.05 mol) is added to the reaction vessel and the reaction mixture is heated at reflux with stirring for a period of about 18 hours. After this time the reaction mixture is cooled and filtered to remove the potassium chloride that is formed. The filtered solution is then stripped of solvent under reduced pressure and the residue is redissolved in an ether-methylene chloride mixture. The resulting solution is then washed with water and is then dried over anhydrous magnesium sulfate. The dried solution is filtered to remove the drying agent and is evaporated to yield O-(1-phenyl-2-methoxyimino-2-methoxyethyl) O-phenyl N-t-butylphosphoramidate as a residue.

EXAMPLE 14

Preparation of 1-Methoxyimino-1-ethoxy-2-(4-chlorophenyl)-2-chloroethane

A newly prepared solution of diazoethane (12 grams 0.2 mol) is placed into a 1-liter glass reaction flask equipped with a magnetic stirrer, and is cooled to a temperature of about 0° C. A solution of N-methoxy-α-(4-chlorophenyl)-α-chloroacetamide (14.5 grams; 0.1 mol) in ether (150 ml.) is then added to the reaction flask, with continuous stirring and cooling, over a period of about 2 hours. After the addition is completed, stirring is continued for about 2 hours. After this time the reaction mixture is stripped of solvent under reduced pressure to yield 1-methoxyimino-1-ethoxy-2-(4-chlorophenyl)-2-chloroethane.

EXAMPLE 15

Preparation of S-[1-(4-chlorophenyl)-2-methoxyimino-2-ethoxyethyl] O-Methyl N-Isopropylthiolophosphoramidate

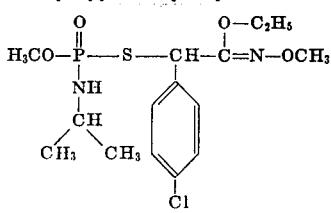

A solution of 1-methoxyimino-1-ethoxy-2-(4-chlorophenyl)-2-chloroethane (12.8 grams; 0.05 mol) in methyl ethyl ketone (150 ml.) is charged into a glass reaction vessel equipped with a mechanical stirrer and reflux condenser. Potassium O-methyl N-isopropylthiolophosphoramidate (10 grams; 0.05 mol) is added to the flask and the reaction mixture is heated at reflux for a period of about 12 hours. After this time the mixture is cooled and filtered to remove the potassium chloride which is formed. The filtered solution is then stripped of solvent under reduced pressure and the residue is redissolved in an ether-methylene chloride mixture. The resulting solution is washed with water and is then dried over anhydrous magnesium sulfate. The dried solution is filtered to remove the drying agent and is evaporated to yield S-[1-(4-chlorophenyl)-2-methoxyimino-2-ethoxyethyl]O-methyl N-isopropylthiolophosphoramidate as a residue.

EXAMPLE 16

Preparation of S-(2-Methoxyimino-2-methoxyethyl) O,O-dimethyl Thionothiolophosphate

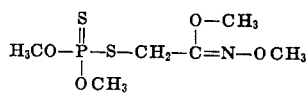

A solution of 1-chloro-2-methoxyimino-2-methoxyethane (5.5 grams; 0.04 mol) in methyl ethyl ketone (100 ml.) was placed into a glass reaction flask equipped with a mechanical stirrer and reflux condenser, and potassium 0,0-dimethyl thionothiolophosphate (8 grams; 0.4 mol) was added thereto. The reaction mixture was then heated at reflux, with stirring, for a period of about 17 hours. After this time the reaction mixture was filtered and the filtrate was distilled to remove the solvent. The resulting residue was dissolved in ether and the ether solution was washed with water and aqueous sodium chloride solution and was thereafter dried over anhydrous magnesium sulfate. The dried solution was then stripped of ether under reduced pressure. The residue was then purified by chromatography on florex using pentane as the eluent to yield S-(2-methoxyimino-2-methoxyethyl) O,O-dimethyl thionothiolophosphate having a refractive index at 27° C. of 1.5203.

EXAMPLE 17

Preparation of 1-Chloro-2-ethoxyimino-2-methoxyethane

A 40 percent aqueous solution of potassium hydroxide (70 ml.) and ether (220 ml.) was placed into a 500 ml. Erlenmeyer flask equipped with a magnetic stirrer and cooling means. The mixture was then cooled, while stirring in the absence of light, to a temperature of about −3° C. N-Nitrosomethylurea (2.5 grams) was then added to the flask over a period of about 5 minutes with continues stirring and cooling. The reaction mixture was then transferred to a precooled 1-liter Erlenmeyer flask and a solution of N-ethoxy-2-chloroacetamide (18 grams; 0.13 mol) in absolute alcohol (80 ml.) was added thereto over a period of about 105 minutes. After the addition was completed, stirring was continued for a period of about 1 hour. The reaction mixture was then allowed to warm to room temperature and dried over anhydrous magnesium sulfate. The mixture was filtered and distilled, and the fraction boiling between 62° and 65° C. at 13 mm. of Hg pressure was collected to yield 1-chloro-2-ethoxyimino-2-methoxyethane having an index of refraction at 25° C. of 1.4556 (D line of sodium) and having the following elemental analysis as calculated for $C_5H_1ClNO_2$:

|  | C | H | N | Cl |
|---|---|---|---|---|
| Theoretical % | 39.6 | 6.6 | 9.2 | 23.4 |
| Found % | 39.27 | 6.44 | 9.24 | 23.49 |

EXAMPLE 18

Preparation of S-(2-Ethoxyimino-2- methoxyethyl) O,O-Dimethyl

Thionothiolophosphate

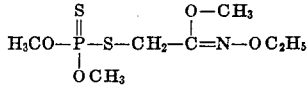

1-Chloro-2-ethoxyimino-2-methoxyethane (3 grams; 0.02 mol), potassium O,O-dimethyl thionothiolophosphate (4 grams; 0.02 mol) and methyl ethyl ketone (100 ml.) were charged into a reaction vessel equipped with a mechanical stirrer and reflux condenser. The reaction mixture was heated at reflux for a period of about 18 hours. After this time the reaction mixture was cooled and filtered. The filtrate was then stripped of solvent and was redissolved in ether. The ether solution was washed with water and dried over anhydrous magnesium sulfate. The dried solution was filtered and evaporated under reduced pressure to yield S-(2-ethoxyimino-2-methoxyethyl) O,O-dimethyl thionothiolophosphate as a residue having a refractive index of 1.5115 at 25° C.

EXAMPLE 19

Preparation of S-(2-Methoxyimino-2- ethoxyethyl) O,O-Dimethyl

Thionothiolophosphate

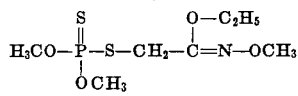

1-Chloro2-methoxyimino-2-ethoxyethane (2.3 grams; 0.015 mol), potassium O,O-dimethyl dithiophosphate (3 grams; 0.015 mol) and methyl ethyl ketone (100 ml.) were charged into a glass reaction vessel equipped with a mechanical stirrer and reflux condenser. The reaction mixture was then heated at reflux, with stirring, for a period of about 21 hours. After this time the reaction mixture was cooled and filtered to remove the potassium chloride which had formed. The filtrate was evaporated under reduced pressure and the residue was dissolved in ether containing a small amount of methylene chloride. The ether solution was then washed with water and dried over anhydrous magnesium sulfate. The dried solution was stripped of solvent under reduced pressure to yield S-(2-methoxyimino-2-ethoxyethyl) O,O-dimethyl thionothiolophosphate having a refractive index of 1.5156 at 24° C.

EXAMPLE 20

Preparation of O-(2-Methoxyimino-2

-methoxyethyl) O,O-Diphenyl Phosphate

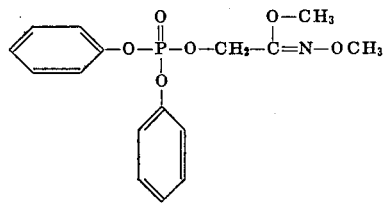

A solution of 1-chloro-2-methoxyimino-2-methoxyethane (5.5 grams; 0.04 mol) in methyl ethyl ketone (100 ml.) is placed into a glass reaction flask equipped with a mechanical stirrer and reflux condenser. Potassium O,O-diphenyl phosphate (11.8 grams; 0.04 mol) is added to the flask and the resulting reaction mixture is heated at reflux for a period of about 20 hours. After this time the reaction mixture is cooled and filtered to remove the potassium chloride which is formed. The filtrate is then stripped of solvent and the residue is dissolved in ether. The ether solution is washed with water and dried over magnesium sulfate. The dried solution is evaporated under reduced pressure to yield O-(2-methoxyimino-2-methoxyethyl) O,O-diphenyl phosphate.

EXAMPLE 21

Preparation of O-(n-Butoxyimino-2- ethoxyethyl) O-(4-Chlorophenyl)

O-Methyl Phosphate

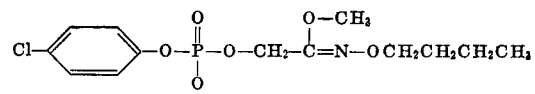

A solution of 1-chloro-2-n-butoxyimino-2-ethoxyethane (9.7 grams; 0.05 mol) in methyl ethyl ketone (100 ml.) is placed into a glass reaction flask equipped with a mechanical stirrer and reflux condenser. Potassium O-(4-chlorophenyl) O-methyl phosphate (12.5 grams; 0.05 mol) is added and the reaction mixture is heated at reflux, with stirring, for a period of about 18 hours. After this time the reaction mixture is cooled and filtered to remove the potassium chloride which has formed. The filtered solution is then stripped of solvent and the residue is dissolved in ether. The ether solution is then washed with water, is dried and then evaporated to yield O-(n-butoxyimino-2-ethoxyethyl) O-(4-chlorophenyl) O-methyl phosphate.

Example 22

Preparation of S-(1-Methyl-2-methoxy-imino-2-methoxyethyl) O,O-Dimethyl Thiolophosphate

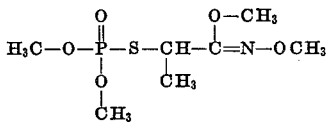

A solution of 1-methoxyimino-1-methoxy-2-chloropropane (7.6 grams; 0.05 mol) in methyl ethyl ketone is charged into a glass reaction flask equipped with a mechanical stirrer and reflux condenser. Potassium O,O-dimethyl thiolophosphate (8 grams; 0.05 mol) is added thereto and the reaction mixture is heated at reflux for a period of about 20 hours with continuous stirring. After this time the reaction mixture is cooled and filtered to remove the potassium chloride that is formed. The filtered solution is then stripped of solvent and the residue is dissolved in ether. The ether solution is washed with water and dried over anhydrous magnesium sulfate. The dried solution is evaporated under reduced pressure to yield S-(1-methyl-2-methoxyimino-2-methoxyethyl) O,O-dimethyl thiolophosphate.

EXAMPLE 23

Preparation of O-(1-Phenyl-2-methoxy-imino-2-methoxyethyl) O-Methyl O-(4-Chlorophenyl) Phosphate

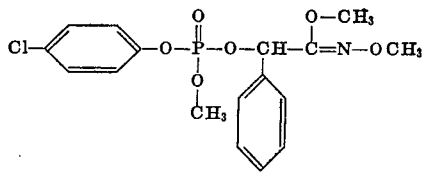

A solution of 1-methoxyimino-1-methoxy-2-phenyl-2-chloroethane (8.3 grams; 0.05 mol) in methyl ethyl ketone (100 ml.) is charged into a glass reaction vessel equipped with a mechanical stirrer and reflux condenser. Potassium O-methyl O-(4-chlorophenyl) phosphate (12.5 grams; 0.05 mol) is added to the reaction vessel and the reaction mixture is heated at reflux, with continuous stirring, for a period of about 18 hours. After this time the reaction mixture is cooled and filtered to remove the potassium chloride that is formed. The filtered solution is stripped of solvent and the residue is dissolved in ether. The ether solution is washed with water and is dried over anhydrous magnesium sulfate. The dried solution is then evaporated under reduced pressure to yield O-(1-phenyl-2-methoxyimino-2-methoxyethyl) O-methyl O-(4-chlorophenyl) phosphate.

EXAMPLE 24

Preparation of 1-Methoxyimino-1-meth-oxy-2-(2-methylphenyl)-2-chloroethane

A newly prepared solution of diazomethane (8.4 grams; 0.2 mol) in ether (100 ml.) is placed in a 1-liter glass reaction flask equipped with a magnetic stirrer and is cooled to a temperature of about 5° C. A solution of N-methoxy-α-(2-methylphenyl)-α-chloroacetamide (12 grams; 0.1 mol) in ether (150 ml.) is then added to the reaction flask, with continuous stirring and cooling, over a period of about 1 hour. After the addition is completed, stirring is continued for a period of about 1 hour to ensure the completion of the reaction. After this time the reaction mixture is stripped of solvent under reduced pressure to yield 1-methoxyimino-1-methoxy-2-(2-methylphenyl)-2-chloroethane.

EXAMPLE 25

Preparation of S-[1-(2-Methylphenyl)-2-methoxyimino-2-methoxyethyl]O-Methyl O-(3,4-Dicholorophenyl) Thiolophosphate

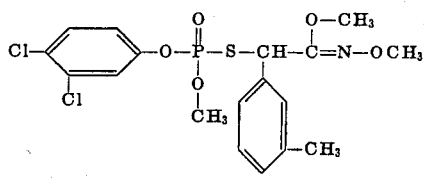

A solution of 1-methoxyimino-1-methoxy-2-(2-methylphenyl)-2-chloroethane (9 grams; 0.05 mol) in methyl ethyl ketone (100 ml.) is charged into a glass reaction vessel equipped with a mechanical stirrer and reflux condenser. Potassium O-methyl O-(3,4-dichlorophenyl) thiolophosphate (15 grams; 0.05 mol) is added to the reaction vessel and the reaction mixture is heated at reflux, with stirring, for a period of about 18 hours. After this time the reaction mixture is cooled and filtered to remove the potassium chloride that is formed. The filtered solution is stripped of solvent and the resulting residue is redissolved in ether. The ether solution is washer with water, dried over magnesium sulfate, and is evaporated under reduced pressure to yield S-[1-(2-methylphenyl)-2-methoxyimino-2-methoxyethyl]O-methyl O-(3,4-dichlorophenyl) thiolophosphate.

EXAMPLE 26

Preparation of O-(2-Methoxyimino-2-methoxyethyl) O-Methyl Methylphosphonate

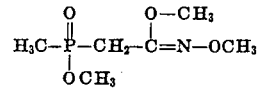

A solution of 1-chloro-2-methoxyimino-2-methoxyethane (7 grams; 0.05 mol) in methyl ethyl ketone (100 ml.) is placed in a glass reaction flask equipped with a mechanical stirrer and reflux condenser Potassium O-methyl methylphosphonate (7.4 grams; 0.05 mol) is added and the reaction mixture is heated at reflux, with stirring, for a period of about 18 hours. After this time the reaction mixture is cooled and filtered to remove the potassium chloride which is formed. The filtered solution is stripped of solvent and the residue is redissolved in ether. The ether solution is washed with water and is dried over anhydrous magnesium sulfate. The dried solution is then evaporated under reduced pressure to yield O-(2-methoxyimino-2-methoxyethyl) O-methyl methylphosphonate.

EXAMPLE 27

Preparation of S-(2-Methoxyimino-2-methoxyethyl) O-Methyl Phenylthionothiolophosphonate

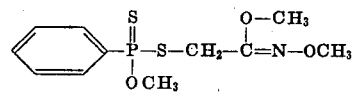

1-Chloro-2-methoxyimino-2-methoxyethane (3.5 grams; 0.025 mol), potassium O-methyl phenylthionothiolophosphonate (6 grams; 0.025 mol) and methyl ethyl ketone (100 ml.) were charged into a glass reaction flask equipped with a mechanical stirrer and reflux condenser. The reaction mixture was then heated at reflux, with continuous stirring, for a period of about 18 hours. After this time the mixture was cooled and filtered to remove the potassium chloride that had formed. The filtrate was evaporated and the resulting residue was dissolved in ether containing a small amount of methylene chloride. The ether solution was washed with water and was dried over anhydrous magnesium sulfate. The dried solution was then stripped of solvents under reduced pressure to yield S-(2-methoxyimino-2-methoxyethyl) O-methyl phenylthionothiolophosphonate as the residue having a refractive index at 25° C. of 1.5789.

EXAMPLE 28

Preparation of S-(2-Ethoxyimino-2- methoxyethyl) O-Methyl

Phenylthiolothionophosphonate

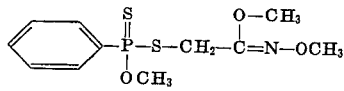

1-Chloro-2-ethoxyimino-2-methoxyethane (3 grams; 0.02 mol), potassium O-methyl phenyl thiolothionophosphonate (5 grams; 0.02 mol) and methyl ethyl ketone (100 ml.) were charged into a glass reaction vessel equipped with a mechanical stirrer and reflux condenser. The reaction mixture was heated at reflux, with continuous stirring, for a period of about 18 hours. After this time the mixture was cooled and filtered to remove the potassium chloride that had formed. The filtrate was evaporated and the resulting residue was dissolved in ether. The ether solution was washed twice with water and was dried over anhydrous magnesium sulfate. The dried solution was then stripped of ether under reduced pressure to yield S-(2-ethoxyimino-2-methoxyethyl) O-methyl phenylthiolothionophosphonate as a residue having a refractive index at 17° C. of 1.5720.

EXAMPLE 29

Preparation of S-(2-Methoxyimino-2- ethoxyethyl) O-Methyl

Phenylthiolothionophosphonate

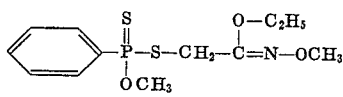

1-Chloro-2-methoxyimino-2-ethoxyethane (2.3 grams; 0.015 mol), potassium O-methyl phenylthiolothionophosphonate (3.5 grams; 0.015 mol) and methyl ethyl ketone (100 ml.) were charged into a glass reaction vessel equipped with a mechanical stirrer and reflux condenser. The reaction mixture was then heated at reflux, with stirring, for a period of about 20 hours. After this time the mixture was cooled and filtered to remove the potassium chloride which had formed. The filtered solution was evaporated and the resulting residue was dissolved in ether containing small amounts of methylene chloride. This solution was washed with water, was dried over anhydrous magnesium sulfate and was filtered. The filtrate was then stripped of solvents under reduced pressure to yield S-(2-methoxyimino-2-ethoxyethyl) O-methyl phenylthiolothionophosphonate having a refractive index of 1.5540 at 25° C.

EXAMPLE 30

Preparation of 1-Chloro-2-ethoxyimino-2-ethoxyethane

A solution of N-ethoxy-α-chloroacetamide (16.5 grams) in a 1:1 alcohol-ether mixture (150 ml.) was slowly added to an excess molar amount of a precooled, freshly prepared solution of diazoethane in ether, with continuous stirring. After the addition was completed, stirring was continued for about 3 hours. After this time the mixture was dried, filtered and stripped of solvents under reduced pressure. The residue was distilled and the fraction boiling at 67° to 69° C. at 22 mm. of Hg pressure was collected as the desired product 1-chloro-2-ethoxyimino-2-ethoxyethane.

EXAMPLE 31

Preparation of S-(2-Ethoxyimino-2- ethoxyethyl) O-Methyl

Phenylthiolothionophosphonate

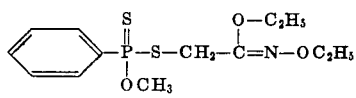

1-Chloro-2-ethoxyimino-2-ethoxyethane (2.5 grams; 0.015 mol), potassium O-methyl phenylthiolothionophosphonate (3.5 grams; 0.015 mol) and methyl ethyl ketone (100 ml.) were charged into a glass reaction flask equipped with a mechanical stirrer and reflux condenser. The reaction mixture was heated at reflux for a period of about 8 hours. After this time the mixture was filtered to remove the potassium chloride that had formed. The filtrate was stripped of solvent and the resulting residue was dissolved in ether containing a small amount of methylene chloride. This solution was washed with water, dried over magnesium sulfate and filtered. The filtrate was evaporated under reduced pressure to yield S-(2-ethoxyimino-2-ethoxyethyl) O-methyl phenylthiolothionophosphonate as a residue having a refractive index at 25° C. of 1.5431.

EXAMPLE 32

Preparation of S-(2-Methoxyimino-2- ethoxyethyl) O-Ethyl

Isopropylthiolophosphonate

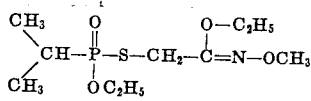

1-Chloro-2-methoxyimino-2-ethoxyethane (4.5 grams; 0.03 mol), potassium O-ethyl isopropylthiolophosphonate (6 grams; 0.03 mol) and methyl ethyl ketone (100 ml.) are charged into a glass reaction flask equipped with stirrer and reflux condenser. The reaction mixture is heated at reflux for a period of about 16 hours with continuous stirring. After this time the reaction mixture is cooled and filtered to remove the potassium chloride which has formed. The filtered solution is then evaporated under reduced pressure and the residue dissolved in an ether-methylene chloride mixture. The resulting solution is washed with water and is dried over anhydrous magnesium sulfate and filtered. The filtered solution is then stripped of solvents under reduced pressure to yield S-(2-methoxyimino-2-ethocyethyl) O-ethyl isopropylthiolophosphonate.

EXAMPLE 33

Preparation of O-(2-Methoxyimino-2- ethoxyethyl) O-Ethyl

4-Chlorophenylphosphonate

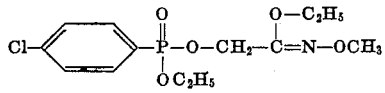

1-Chloro-2-methoxyimino-2-ethoxyethane (4.5 grams; 0.03 mol), potassium O-ethyl 4-chlorophenylphosphonate (7.7 grams; 0.03 mol) and methyl ethyl ketone (100 ml.) are charged into a glass reaction flask equipped with stirrer and reflux condenser. The reaction mixture is heated at reflux for a period of about 16 hours with continuous stirring. After this time the reaction mixture is cooled and filtered to remove the potassium chloride which has formed. The filtered solution is then evaporated under reduced pressure and the residue dissolved in an ether-methylene chloride mixture. The resulting solution is washed with water and is dried over anhydrous magnesium sulfate and filtered. The filtered solution is then stripped of solvents under reduced pressure to yield O-(2-methoxyimino-2-ethoxyethyl) O-ethyl 4-chlorophenylphosphonate.

EXAMPLE 34

Preparation of O-(2-Methoxyimino-2- methoxyethyl) O-Phenyl

Phenylphosphonate

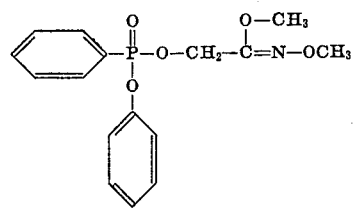

A solution of 1-chloro-2-methoxyimino-2-methoxyethane (7 grams; 0.05 mol) in methyl ethyl ketone (100 ml.) is placed into a glass reaction flask equipped with a mechanical stirrer and reflux condenser. Potassium O-phenyl phenylphosphonate (13 grams; 0.05 mol) is added and the reaction mixture is heated at reflux, with stirring, for a period of about 18 hours. After this time the reaction mixture is cooled and filtered to remove the potassium chloride which is formed. The filtered solution is then stripped of solvent under reduced pressure and the residue is redissolved in an ether-methylene chloride mixture. The resulting solution is washed with water and dried over anhydrous magnesium sulfate. The dried solution is then filtered and evaporated to yield O-(2-methoxyimino-2-methoxyethyl) O-phenyl phenylphosphonate.

EXAMPLE 35

Preparation of S-(1-Methyl-2-methoxyimino-2-methoxyethyl) O-Methyl

Methylthiolophosphonate

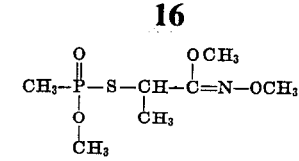

A solution of 1-methoxyimino-1-methoxy-2-chloropropane (7.6 grams; 0.05 mol) in methyl ethyl ketone is charged into a glass reaction flask equipped with a mechanical stirrer and reflux condenser. Potassium O-methyl methylthiolophosphonate (7.2 grams; 0.05 mol) is added thereto and the reaction mixture is heated at reflux for a period of about 20 hours with continuous stirring. After this time the reaction mixture is cooled and filtered to remove the potassium chloride that is formed. The filtered solution is then stripped of solvent and the residue is dissolved in ether. The ether solution is washed with water and dried over anhydrous magnesium sulfate. The dried solution is evaporated under reduced pressure to yield S-(1-methyl-2-methoxyimino-2-methoxyethyl) O-methyl methylthiolophosphonate.

EXAMPLE 36

Preparation of O-(1-Phenyl-2-methoxyimino-2-methoxyethyl) O-Methyl (4-Chlorophenyl)phosphonate

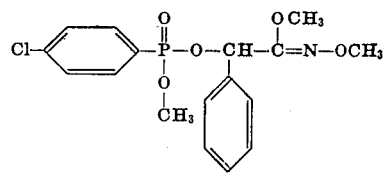

A solution of 1-methoxyimino-1-methoxy-2-phenyl-2-chloroethane (8.3 grams; 0.05 mol) in methyl ethyl ketone (100 ml.) is charged into a glass reaction vessel equipped with a mechanical stirrer and reflux condenser. Potassium O-methyl (4-chlorophenyl)phosphonate (11.7 grams; 0.05 mol) is added to the reaction vessel and the reaction mixture is heated at reflux, with continuous stirring, for a period of about 18 hours. After this time the reaction mixture is cooled and filtered to remove the potassium chloride that is formed. The filtered solution is stripped of solvent and the residue is dissolved in ether. The ether solution is washed with water and is dried over anhydrous magnesium sulfate. The dried solution is the evaporated under reduced pressure to yield O-(1-phenyl-2-methoxyimino-2-methoxyethyl) O-methyl (4-chlorophenyl)phosphonate.

EXAMPLE 37

Preparation of S-[-(2-Methylphenyl)-2- methoxyimino-2-methoxyethyl]O-(3,4-

Dichlorophenyl) Methylthiolophosphonate

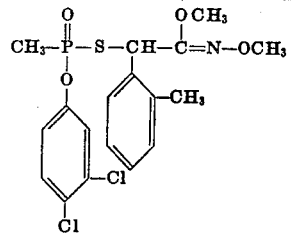

A solution of 1-methoxyimino-1-methoxy-2(2-methylphenyl)-2-chloroethane (9 grams; 0.05 mol) in methyl ethyl ketone (100 ml.) is charged into a glass reaction vessel equipped with a mechanical stirrer and reflux condenser. Potassium O-(3,4-dichlorophenyl) methylthiolophosphonate (14.2 grams; 0.05 mol) is added to the reaction vessel and the reaction mixture is heated at reflux, with stirring, for a period of about 18 hours. After this time the reaction mixture is cooled and filtered to remove the potassium chloride that is formed. The filtered solution is stripped of solvent and the resulting residue is redissolved in ether. The ether solution is washed with water, dried over magnesium sulfate, and is evaporated under reduced pressure to yield S-[1-(2-methylphenyl)-2-methoxyimino-2-methoxyethyl]O-(3,4-dichlorophenyl) methylthiolophosphonate.

EXAMPLE 38

Preparation of O-(2-Methoxyimino-2-methoxyethyl) Dimethylphosphinate

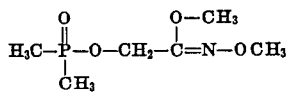

A solution of 1-chloro-2-methoxyimino-2-methoxy ethane (7 grams; 0.05 mol) in methyl ethyl ketone (100 ml.) is placed into a glass reaction flask equipped with a mechanical stirrer and reflux condenser. Potassium dimethylphosphinate (6.6 grams; 0.05 mol) is added and the reaction mixture is heated at reflux with stirring, for a period of about 18 hours. After this time the reaction mixture is cooled and filtered to remove the potassium chloride which is formed. The filtered solution is then stripped of solvent under reduced pressure and the residue is redissolved in an ether-methylene chloride mixture. The resulting solution is washed with water and dried over anhydrous magnesium sulfate. The dried solution is then filtered and evaporated to yield O-(2-methoxyimino-2-methoxyethyl) dimethylphosphinate.

EXAMPLE 39

Preparation of S-(2-Methoxyimino-2-ethoxyethyl) Diisopropylthiolophosphinate

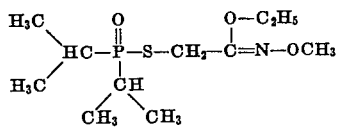

1-Chloro-2-methoxyimino-2-ethoxyethane (4.5 grams; 0.03 mol), potassium diisopropylthiolophosphinate (6.1 grams; 0.03 mol) and methyl ethyl ketone (100 ml.) are charged into a glass reaction flask equipped with stirrer and reflux condenser. The reaction mixture is heated at reflux for a period of about 16 hours with continuous stirring. After this time the reaction mixture is cooled and filtered to remove the potassium chloride which is formed. The filtered solution is then evaporated under reduced pressure and the residue dissolved in an ether-methylene chloride mixture. The resulting solution is washed with water and is dried over anhydrous magnesium sulfate and filtered. The filtered solution is then stripped of solvents under reduced pressure to yield S-(2-methoxyimino-2-ethoxyethyl) diisopropylthiolophosphinate.

EXAMPLE 40

Preparation of O-(2-n-Butoxyimino-2-ethoxyethyl) (4-Chlorophenyl)methylphosphinate

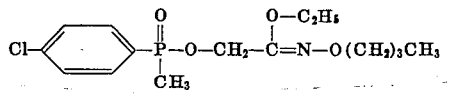

A solution of 1-chloro-2-n-butoxyimino-2-ethoxyethane (9.7 grams; 0.05 mol) in methyl ethyl ketone (100 ml.) is placed into a glass reaction flask equipped with a mechanical stirrer and reflux condenser. Potassium (4-chlorophenyl)methylphosphinate (11.4 grams; 0.05 mol) I added and the reaction mixture is heated at reflux, with stirring, for a period of about 18 hours. After this time the reaction mixture is cooled and filtered to remove the potassium chloride which has formed. The filtered solution is then stripped of solvent under reduced pressure and the residue is redissolved in an ether-methylene chloride mixture. The resulting solution is washed with water and is dried over anhydrous magnesium sulfate. The dried solution is then filtered and evaporated to yield O-(2-n-butoxyimino-2-ethoxyethyl) (4-chlorophenyl)methylphosphinate.

EXAMPLE 41

Preparation of S-(2-Isopropoxyimino-2-methoxyethyl) Benzylphenylthiolothionophosphinate

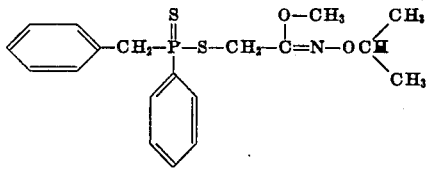

A solution of 1-chloro-2-isopropoxyimino-2-methoxyethane (8.5 grams; 0.05 mol) in methyl ethyl ketone (100 ml.) is placed into a glass reaction flask equipped with a mechanical stirrer and reflux condenser. Potassium benzylphenylthiolothionophosphinate (15 grams; 0.05 mol) is added to the flask and the reaction mixture is heated at reflux for a period of about 12 hours. After this time the reaction mixture is cooled and filtered to remove the potassium chloride which has formed. The filtered solution is then stripped of solvent under reduced pressure and the residue is redissolved in an ether-methylene chloride mixture. The resulting solution is washed with water and dried over anhydrous magnesium sulfate. The dried solution is filtered and stripped of solvent under reduced pressure to yield S-(2-isopropoxyimino-2-methoxyethyl) benzylphenylthiolothionophosphinate as a residue.

EXAMPLE 42

Preparation of S-(1-Methyl-2-methoxyimino-2-methoxyethyl) Dimethylthiolophosphinate

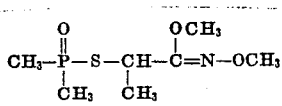

A solution of 1-methoxyimino-1-methoxy-2-chloropropane (7.6 grams; 0.05 mol) in methyl ethyl ketone is charged into a glass reaction flask equipped with a mechanical stirrer and reflux condenser. Potassium dimethylthiolophosphinate (6.7 grams; 0.05 mol) is added thereto and the reaction mixture is heated at reflux for a period of about 20 hours with continuous stirring. After this time the reaction mixture is cooled and filtered to remove the potassium chloride that is formed. The filtered solution is then stripped of solvent and the residue is dissolved in ether. The ether solution is washed with water and dried over anhydrous magnesium sulfate. The dried solution is evaporated under reduced pressure to yield S-(1-methyl-2-methoxyimino-2-methoxyethyl) dimethylthiolophosphinate.

EXAMPLE 43

Preparation of O-(1Phenyl-2-methoxyimino-2-methoxyethyl)

(4-Chlorophenyl)methylphosphinate

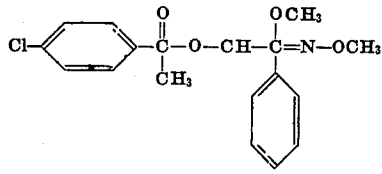

A solution of 1-methoxyimino-1-methoxy-2-phenyl-2-chloroethane (8.3 grams; 0.05 mol) in methyl ethyl ketone (100 ml.) is charged into a glass reaction vessel equipped with a mechanical stirrer and reflux condenser. Potassium (4-chlorophenyl)methylphosphinate (10.7 grams; 0.05 mol) is added to the reaction vessel and the reaction mixture is heated at reflux, with continuous stirring, for a period of about 18 hours. After this time the reaction mixture is cooled and filtered to remove the potassium chloride that is formed. The filtered solution is stripped of solvent and the residue is dissolved in ether. The ether solution is washed with water and is dried over anhydrous magnesium sulfate. The dried solution is then evaporated under reduced pressure to yield O-(1-phenyl-2-methoxyimino-2-methoxyethyl) (4-chlorophenyl)methylphosphinate.

EXAMPLE 44

Preparation of S-[1-(2-Methylphenyl)-

2-methoxyimino-2-methoxyethyl] (3,4-

Dichlorophenyl)methylthiolophosphinate

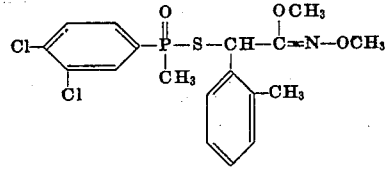

A solution of 1-methoxyimino-1-methoxy-2-(2-methyl phenyl)-2-chloroethane (9 grams; 0.05 mol) in methyl ethyl ketone (100 ml.) is charged into a glass reaction vessel equipped with a mechanical stirrer and reflux condenser. Potassium (3,4-dichlorophenyl)methylthiolophosphinate (13.2 grams; 0.05 mol) is added to the reaction vessel and the reaction mixture is heated at reflux, with stirring, for a period of about 18 hours. After this time the reaction mixture is cooled and filtered to remove the potassium chloride that is formed. The filtered solution is stripped of solvent and the resulting residue is redissolved in ether. The ether solution is washed with water, dried over magnesium sulfate, and is evaporated under reduced pressure to yield S-[1-(2-methylphenyl)-2-methoxyimino-2-methoxyethyl] (3.4-dichlorophenyl methylthiolophosphinate.

Other nematocidally active compounds within the scope of this invention which can be prepared by the procedures described in the foregoing examples are:

O-(2-methoxyimino-2-methoxyethyl) O-(4-bromophenyl) N,N-di-n-butylphosphoramidate O-(2-methoxyimino-2-ethoxyethyl) O-(4-methoxyphenyl) N,N-diethylphosphoramidate O-(2-n-butoxyimino-2-ethoxyethyl) S-(2,4-dinitrophenyl) N-isopropylthiolophosphoramidate S-(2-isopropoxyimino-2-methoxyethyl) O-(3-methylthiophenyl) N,N-dimethylthiolophosphoramidate O-(2-methoxyimino-2-methoxyethyl) O-(4-methylsulfinylphenyl) N-methylphosphoroamidate O-(2methoxyimino-2-ethoxyethyl) O-(3-ethylsulfonylphenyl) N,N-di-n-decylphosphoramidate O-(2-ethoxyimino-2-methoxyethane) S-n-propyl N,N-dimethylthiolophosphoramidate S-(2-methoxyimino-2-methoxyethyl) S-(4-dimethylaminophenyl) N-ethyldithiolophosphoramidate O-(2-n-propoxyimino-2-methoxyethyl) O-ethyl N-isopropylthionophosphoramidate O-(2-methoxyimino-2-methoxyethyl) S-ethyl N,N-dimethylthiolothionophosphoramidate S-(2-n-butoxyimino-2-methoxyethyl) O-(3-bromo-4-chlorophenyl) N,N-dimethylthiolothionophosphoramidate O-(2-methoxyimino-2-octyloxyethyl) 4-chlorophenyl-N-ethylphosphonamidate O-(2-methoxyimino-2-ethoxyethyl) 3,4-dichlorobenzyl-N-ethylthionophosphonamidate S-(2-methoxyimino-2-methoxyethyl) phenyl-N,N-dimethylthiolophosphonamidate S-(2-ethoxyimino-2-n-propoxyethyl) 2-methoxy-4-chlorobenzyl-N-isopropylthiolothionophosphonamidate O-(1-ethyl-2-methoxyimino-2-methoxyethyl) O-(4-methylphenyl) N-n-propylphosphoramidate O-(1-phenyl-2-methoxyimino-2n-butoxyethyl) O-ethyl N,N-dimethylphosphoramidate O-[1-(3-dimethylaminophenyl)-2-ethoxyimino-2-methoxyethyl] O-(2-methyl-4-chlorophenyl) N,N-diethylphosphoramidate O-[1-(2,4-dichlorophenyl)-2-methoxyimino-2-ethoxyethyl] O-(3-ethylsulfonylphenyl) N-ethylphosphoramidate O-[1-(4-bromophenyl)-2-methoxyimino-2-methoxyethyl] S-ethyl N-methylthiolophosphoramidate S-[1-(2-methyl-4-chlorophenyl)-2-methoxyimino-2-methoxyethyl] S-benzyl N-methyldithiolophosphoramidate O-[1-3-nitrophenyl)-2-methoxyimino-2-methoxyethyl] S-ethyl N-isopropylthiolothionophosphoramidate O-(1-ethyl-2-ethocyimino-2-methoxyethyl) 4-chlorophenyl-N-methylphosphonamidate O-(1-phenyl-2-methoxyimino-2-methoxyethyl) ethyl-N-t-butylthionophosphonamidate O-[1-(2,4-dibromophenyl)-2-methoxyimino-2-methoxyethyl] 3-bromophenyl-N-isopropylphosphonamidate S-(1-methyl-2-methoxyimino-2-methoxyethyl) phenyl-N-isopropylthiolophosphonamidate O-(1-n-butyl-2-methoxyimino-2-methoxyethyl) 2-methyl-4-chlorophenyl-N-isopropylphosphonamidate O[1-(4-allylphenyl)-2-methoxyimino-2-methoxyethyl] 3-nitrophenyl-N,N-dimethylphosphonamidate O-(2-methoxyimino-2-methoxyethyl) O,O-dimethyl phosphate O-(2-methoxyimino-2-ethoxyethyl) O-methyl O-isopropyl phosphate O-(2-ethoxyimino-2-methoxyethane) O,O-di-n-butyl thionophosphate O-(2-methoxyimino-2-methoxyethyl) O-(2-chloro-4-methylphenyl) O-methyl phosphate O-(2-methoxyimino-2-methoxyethyl) O-(3-nitrophenyl) O- methyl phosphate
O-2-ethoxyimino-2-ethoxyethyl) O-(4-methylsulfonylphenyl) O-phenyl phosphate
O-(2-methoxyimino-2-methoxyethyl) O-(2-dimethylaminophenyl) O-methyl phosphate
O-(2-methoxyimino-2-methoxyethyl) O-methyl O-(3,4-dichlorobenzyl) phosphate

S-(2-methoxyimino-2-methoxyethyl) O-(4-bromophenyl) O-ethyl thionothiolophosphate O-(2-methoxyimino-2-n-pentyloxethyl) O-methyl S-(3-bromophenyl) thionothiolophosphate S-(2-methoxyimino-2-methoxyethyl) S,S-dimethyl dithiolophosphate S,S-dimethyl dithiolophosphate O-(2methoxyimino-2-methoxyethyl) S-methyl S-phenyl thionodithiolophosphate S-(2-methoxyimino-2ethoxyethyl) S,S-diphenyl tetrathiophosphate O-(2-n-propoxyimino-2-n-propoxyethyl) O-ethyl O-(2-methoxy-4-allylphenyl) phosphate O-(2-n-octyloxyimino-2-methoxyethyl) O-allyl O-(3-methylsulfinylphenyl) phosphate O-(2-methoxyimino-2-methoxyethyl) O-2-pentenyl O-(3-methylthio-5-isopropylphenyl) phosphate O-(1-ethyl-2-methoxyimino-2-methoxyethyl) O,O-diethyl phosphate O-[1-(3-dimethylaminophenyl)-2-ethoxyimino-2-methoxyethyl] O-methyl O-(3-methylsulfonylphenyl) phosphate O-[1-(4-iodophenyl)-2-n-pentyloxyimino-2-ethoxyethyl] S-n-decyl O-(4-methylsulfinylphenyl) thiolophosphate O-[1-(3-chlorobenzyl)-2-methoxyimino-2-octyloxyethyl] O,O-diphenyl phosphate S-[1-(4-fluorophenyl)-2-n-propoxyimino-2-n-hexyloxyethyl]O,O-di-n-pentyl thiolophosphate O-[1-(4-chlorophenethyl)-2-methoxyimino-2-methoxyethyl] S-(4-isopropylthiophenyl) O-octyl thiolophosphate S-[1-(2,4,6-trichlorophenyl)-2-methoxyimino-2-methoxyethyl] S-(3-phenyl-n-propyl) O-methyl dithiolophosphate O-[1-1-(4-pentenylphenyl)-2-n-butoxyimino-2-n-propoxyethyl] S-(4-allylphenyl) S-(3-bromophenyl) dithiolophosphate O-(1-n-butyl-2-methoxyimino-2-methoxyethyl) O,O-didecyl thionophosphate O-(1-decyl-2-methoxyimino-2-methoxyethyl) S,S-dimethyl dithiolophosphate S-[1-(2,4-dimethoxyphenyl)-2-methoxyimino-2-methoxyethyl] S-(4-pentylsulfonylphenyl) S-methyl trithiolophosphate O-(1-benzyl-2-ethoxyimino-2-methoxyethyl) O-isopropyl O-methyl phosphate O-(2-methoxyimino-2-methoxyethyl) O-n-butyl n-pentylphosphonate O-(2-methoxyimino-2-n-propoxyethyl) O-n-octyl phenylphosphonate O-(2-ethoxyimino-2-n-butoxyethyl) O-n-octyl methylphosphonate O-(2-isopropoxyimino-2n-hexyloxyethyl) O-n-decyl 3-bromophenylphosphonate O-(2-n-pentoxyimino-2-n-octyloxyethyl) O-phenyl 2,4-diiodophenylphosphonate O-(2-decyloxyimino-2methoxyethyl) O-benzyl 3-fluorophenylphosphonate O-(2-methoxyimino-2-ethoxyethyl) O-phenylethyl 3,4-dimethylphenylthionophosphonate O-(2-methoxyimino-2-methoxyethyl) S-phenyl methylthiolophosphonate O-(2-t-butoxyimino-2-methoxyethyl) O-(2-methoxyphenyl) isopropylphosphonate O-(2-methoxyimino-2-pentyloxyethyl) O-(4-isopropylphenyl) 3-nitrophenylphosphonate S-(2-methoxyimino-2-methoxyethyl) S-(3-methylsulfonylphenyl) benzyldithiolophosphonate S-(2-methoxyimino-2-ethoxyethyl) O-(2-ethylthiophenyl) ethylthiolothionophosphonate O-(2-ethoxyimino-2-ethoxyethyl) S-(4-isopropylthiophenyl) 2-ethoxyphenylthionolophosphonate O-(2-ethoxyimino-2-methoxyethyl) O-(3-methylsulfinylphenyl) decylphosphonate O-(2-methoxyimino-2-methoxyethyl) O-(3-pentoxyphenyl) 2,4,6-trichlorophenylphosphonate O-(2-methoxyimino-2-methoxyethyl) O-(4-decyloxyphenyl) 2,4-dinitrophenylphosphonate S-(2-isopropoxyimino-2-methoxyethyl) O-(3,5-di-n-butylphenyl) 2,6-dimethoxy-4-chlorophenylthiolophosphonate O-(2-n-butoxyimino-2-methoxyethyl) O-(4-pentylthiophenyl) 3-dimethylaminophenylthionophosphonate O-(2-ethoxyimino-2-hexyloxyethyl) S-(3-diethylaminophenyl) 4-n-butylsulfonylbenzylthiolophosphonate S-(2-methoxyimino-2-n-propoxyethyl) S-(4-di-n-pentylaminophenyl) 2,4-dibromobenzyldithiolophosphonate O-(2-methoxyimino-2-methoxyethyl) O-(4-isopropylsulfinylphenyl) allylphosphonate O-(2-ethoxyimino-2-ethoxyethyl) O-(2,4-dinitrophenyl) 2-pentenylthionophosphonate S-(2-methoxyimino-2-ethoxyethyl) S-(2-chloro-4-allylphenyl) 4-octenyltrithiophosphonate O-(2-methoxyimino-2-methoxyethyl) O-(3-chloro-5-hex-3-enylphenyl) 3-phenylpropylphosphonate O-(2-decyloxyimino-2-methoxyethyl) O-decyl decylphosphonate S-(2-methoxyimino-2-decyloxyethyl) O-5-octenyl 4-allylphenylthiolothionophosphonate O-(1-ethyl-2-methoxyimino-2-methoxyethyl) O-ethyl ethylphosphonate O-[1-(3-dimethylaminophenyl)-2-ethoxyimino-2-methoxyethyl] O-methyl (3-methylsulfonylphenyl)phosphonate O-[1-(4-iodophenyl)-2-n-pentyloxyimino-2-ethoxyethyl] S-n-decyl (4-methylsulfinylphenyl) thiolophosphonate O-[1-(3-chlorobenzyl)-2-methoxyimino-2-octyloxyethyl] O-phenyl phenylphosphonate S-[1-(4-fluorophenyl)-2-n-propoxyimino-2-n-hexyloxyethyl] O-n-pentyl n-pentylthiolophosphonate O-[1-(4-chlorophenethyl)-2-methoxyimino-2-methoxyethyl] S-(4-isopropylthiophenyl) octylthiolophosphonate S-[1-(2,4,6-trichlorophenyl)-2-methoxyimino-2-methoxyethyl] S-(3-phenyl-n-propyl) methylthiolophosphonate O-[1-(4-pentenylphenyl)-2-n-butoxyimino-2-n-propoxyethyl] S-(4allylphenyl) (3-bromophenyl)thiolophosphonate O-(1-n-butyl-2-methoxyimino-2-methoxyethyl) O-decyl decylthionophosphonate O-(1-decyl-2-methoxyimino-2-methoxyethyl) S-methyl methylthiolophosphonate S-[1-(2,4-dimethoxyphenyl)-2-methoxyimino-2-methoxyethyl] S-(4-pentylsulfonylphenyl) methylthionothiolophosphonate O-(1-benzyl-2-ethoxyimino-2-methoxyethyl) O-isopropyl methylphosphonate O-(2-methoxyimino-2-methoxyethyl) diethylphosphinate O-(2-methoxyimino-2-ethoxyethyl) di-n-butylphosphinate O-(2-methoxyimino-2-methoxyethyl) didecylphosphinate O-(2-methoxyimino-2-n-propoxyethyl) phenylmethylphosphinate O-(2-ethoxyimino-2-n-butoxyethyl) (4-chlorophenyl)ethylphosphinate O-(2-methoxyimino-2-n-pentyloxyethyl) diphenylphosphinate O-(2-isopropoxyimino-2-hexyloxyethyl) (3,4-dibromophenyl) ethylphosphinate O-(2-n-butoxylimino-2-n-heptyloxyethyl) (3,5-diiodophenyl) isopropylphosphinate O-(2-methoxyimino-2-n-octyloxyethyl) (4-fluorophenyl)pentylphosphinate O-(2-ethoxyimino-2-n-decyloxyethyl) (3-nitrophen-

0013

10108814 yl)decylphosphinate

O-(2-n-pentyloxyimino-2-methoxyethyl) (2,4-dimethylphenyl)phenylphosphinate

O-(2-n-octyloxyimino-2-methoxyethyl) (4-isopropylphenyl) phenylphosphinate

O-(2-n-decyloxyimino-2-ethoxyethyl) (2-bromo-4-n-pentylphenyl)benzylphosphinate

O-(2-methoxyimino-2-methoxyethyl) (3-chloro-5-allylphenyl) (4-decylphenyl)phosphinate O-(2-methoxyimino-2-methoxyethyl) (3-pent-2enylphenyl) allylphosphinate O-(2-ethoxyimino-2-methoxyethyl) (2,6-dimethoxy-4-chlorophenyl)(4-octenyl)phosphinate O-(2-methoxyimino-2ethoxyethyl) (4-ethoxyphenyl) (8-decenyl)phosphinate O-(2-n-butoxyimino-2-ethoxyethyl) (3n-butoxyphenyl)isopropylthionophosphinate S-(2-isopropoxyimino-2-methoxyethyl) (3-octyloxyphenyl)(3, 4,5-trichlorobenzyl)thiolophosphinate O-(2-methoxyimino-2-methoxyethyl) (3-nitrophenyl) (4-decyloxyphenyl)phosphinate O-(2-methoxyimino-2-methoxyethyl) (3,4-dinitrophenyl) (4-methylthiophenyl)phosphinate S-(2-t-butoxyimino-2-methoxyethyl) (4-n-propylthiophenyl) (3-dimethylaminophenyl)thiolophosphinate S-(2-methoxyimino-2-n-pentyloxyethyl) (4-hexylethiophenyl) (3-diethylaminophenyl)thiolothionophosphinate O-(2-ethoxyimino-2-ethoxyethyl) (4-decylthiophenyl) (3-di-n-butylaminobenzyl)phosphinate O-( 2-methoxyimino-2-methoxyethyl) (4-di-n-decylaminophenyl)methylphosphinate S-(2-methoxyimino-2-methoxyethyl) (4-methylsulfonylphenyl)methylthiolophosphinate S-(2-methoxyimino-2-ethoxyethyl) (3-isopropylsulfonylphenyl) (3-phenylpropyl)thiolothionophosphinate O-(2-methoxyimino-2methoxyethyl) bis-(p-ethylthiophenyl) phosphinate O-(2-nonyloxyimino-2-methoxyethyl) (4-decylsulfonylphenyl)benzylthionophosphinate O-(2-isopropoxyimino-2-n-butoxyethyl) (3-methylsulfinylphenyl) (2-methyl-4-nitrophenyl)phosphinate O-(2-methoxyimino-2-n-propane) (4-pentylsulfinylphenyl) allylphosphinate S-(2-methoxyimino-2-methoxyethyl) (4-decylsulfinylbenzyl) (2,4-dichlorobenzyl)thiolothionophosphinate O-(1-ethyl-2-methoxyimino-2-methoxyethyl) diethylphosphinate O-[1-(3-dimethylaminophenyl)-2-ethoxyimino-2-methoxyethyl] (3-methylsulfonylphenyl)methylphosphinate S-[1-(4-iodophenyl)-2-n-pentyloxyimino-2-ethoxyethyl] (4-methylsulfinylphenyl)decylthiolophosphinate O-[1-(3-chlorobenzyl)-2-methoxyimino-2-octylocyethyl] diphenylphosphinate S-[1-(4-fluorophenyl)-2-n-propoxyimino-2-n-hexyloxyethyl] di-n-pentylthiolophosphinate S-[1-(4-chlorophenethyl)-2-methocyimino-2-methoxyethyl] (4-isopropylthiophenyl)octylthiolophosphinate O-[1-(2,4,6-trichlorophenyl)-2-methoxyimino-2-methoxyethyl] (3-phenyl-n-propyl)methylphosphinate O-[1-(4-pentenylphenyl)-2-n-butoxyimino-2-n-propoxyethyl] (4-allylphenyl) (3-bromophenyl)phosphinate O-(1-n-butyl-2-methoxyimino-2-methoxyethyl) didecylthionophosphinate O-(1-decyl-2-methoxyimino-2-methoxyethyl) dimethylphosphinate O-[1-(2,4-dimethoxyphenyl)-2-methoxyimino-2-methoxyethyl] (4-pentylsulfonylphenyl)methylphosphinate O-(1-benzyl-2-ethoxyimino-2-methoxyethyl) isopropylmethylphosphinate O-(2-n-pentyloxyimino-2-n-butoxyethyl) O-isopropoxy N,N-dimethylphosphoramidate O-(2-n-decyloxyimino-2-methoxyethyl) S-methyl N,N-diethylthiolophosphoramidate O-(2-methoxyimino-2-octylocyethyl) S-n-pentyl N-n-hexylthioprophosphoramidate O-(2-methoxyimino-2-methoxyethyl) O-allyl N-isopropylphosphoramidate O-(2-ethoxyimino-2-methoxyethyl) O-(2-pentenyl) N-ethylphosphoramidate O-(2-methoxyimino-2-methoxyethyl) O-(3-decenyl) N,N-di-n-butylphosphoramidate O-(2-methoxyimino-2-methoxyethyl) O-( 2-ethyl-4-iodophenyl) N-methyl phosphoramidate O-(2-methoxyimino-2-methoxyethyl) O-(2-fluoro-4-n-butyl phenyl) N-isopropylphosphoramidate O-(2-methoxyimino-2-methoxyethyl) O-(2-ethoxy-4-allylphenyl) N-isopropylphosphoramidate O-(2-methoxyimino-2-methoxyethyl) O-(3-isopropylthio-5-pentenylphenyl) N-isopropylphosphoramidate O-(2-methoxyimino-2-methoxyethyl) O-(3-nitro-5-decylphenyl) N,N-dimethylphosphoramidate O-(2-ethoxyimino-2-methoxyethyl) O-(4-t-butoxyphenyl) N,N-diethylphosphoramidate O-(2-ethoxyimino-2-heptyloxyethyl) O-[3-(2-hexenyl) phenyl] N-ethylphosphoramidate O-(2-methoxyimino-2-ethoxyethyl) O-(2-n-decyloxy-4-chlorophenyl) N-isopropylphosphoramidate S-(2-methoxyimino-2-methoxyethyl) O-(3-n-pentylthiophenyl) N,N-di-n-octylthiolophosphoramidate S-(2-methoxyimino-2-methoxyethyl) O-(4-isopropylsulfonylphenyl) thiolothionophosphoramidate S-(2-methoxyimino-2-methoxyethyl) O-(2-diethylamino-5-chlorophenyl) N-isopropylthiolophosphoramidate O-(2-methoxyimino-2methoxyethyl) methyl-N,N-dimethylphosphonamidate O-(2-methoxyimino-2-methoxyethyl) isopropyl-N-isopropylphosphonamidate O-(2-methoxyimino-2-methoxyethyl) pentylphosphonamidate O-(2-ethoxyimino-2-decyloxyethyl) allyl-N-t-butylphosphonamidate O-(2-octyloxyimino-2-pentyloxyethyl) t-butylphosphonamidate O-(2-methoxyimino-2-methoxyethyl) 2-pentenyl-N-t-butyl phosphonamidate O-(2-methoxyimino-2-methoxyethyl) 3-n-propylsulfinylphenyl-N-isopropylphosphonamidate O-(2-methoxyimino-2-methoxyethyl) 3-(4-di-n-butylaminophenyl)-propyl-N,N-dimethylphosphonamidate O-(2-methoxyimino-2-methoxyethyl) 4-pentylsulfinylphenylethyl-N-isopropylphosphonamidate O-(1-n-butyl-2-methoxyimino-2-methoxyethyl) O-(3-fluorophenyl) N-isopropylphosphoramidate O-(1-hexyl-2-methoxyimino-2-methoxyethyl) S-(4-iodophenyl) N-t-butylthiolophosphoramidate O-(1-decyl-2-methoxyimino-2-methoxyethyl) O-(4-allylphenyl) N,N-di-n-butylphosphoramidate O-(1-pentylthio-2-methoxyimino-2-methoxyethyl) O-(3-phenylpropyl) thionophosphoramidate S-(1-allyloxy-2-methoxyimino-2-octyloxyethyl) O-methylthiolothionophosphoramidate O-[1-(4-decylsulfonylphenyl)-2-methoxyimino-2-methoxyethyl] O-isopropyl thionophosphoramidate O-[1-(3-pentylsulfinylphenyl)-2-ethocyimino-2-methoxyethyl] S-(2-diethylaminophenyl) N-n-pentylthiolophosphoramidate O-[1-(3-pentenyloxy)-2-methoxyimino-2-methoxyethyl] O-(3-allylbenzyl) N,N-dimethylthionophosphoramidate O-[1-(5-phenylpentyl)-2-methoxyimino-2-methoxyethyl] O-(2-methyl-4-chlorophenethyl) N-isopropylphosphoramidate S-[1-(3,4-dibromophenyl)-2-ethoxyimino-2-n-butylethyl] N,N-di-n-propyl-2-dimethylaminophenylthiolophosphonamidate O-(1-benzylthio-2-n-propoxyimino-2-methoxyethyl) N-heptyl-2-chloro-4-nitrophenylphosphonamidate O-(1-phenethyloxy-2-methoxyimino-2-methoxyethyl) N,N-diethyl-3-methylthiobenzylthionophosphonamidate S-[1-(2,6-dimethoxyphenethyl)-2-methoxyimino-2- methoxyethyl] N-t-butyl-4-n-pentylsulfonylphenyl-dithiophosphonamidate

O-(2-methoxyimino-2-methoxyethyl) S-isopropyl S-phenethyldithiolophosphate

O-(2-methoxyimino-2-ethoxyethyl) O-(4-chlorphenyl) O-(2-ethoxy-4,5-dibromophenyl) phosphate O-(2-ethoxyimino-2-methoxyethyl) O,O-di-n-decyl phosphate O-(2-ethoxyimino-2-ethoxyethyl) O-(3-iodophenyl) o-(3-isopropoxy-5-n-pentylphenyl) phosphate O-(2-methoxyimino-2-methoxyethyl) O-(2,6-diethoxyphenyl O-(4-n-propylsulfonylphenyl) phosphate O-(2-methoxyimino-2-methoxyethyl) O-(3-n-butylthiophenyl) O-(4-ethylsulfinylphenyl) phosphate O-(2-methoxyimino-2-methoxyethyl) S-(2,4-dinitrophenyl) S-(3,4-dichlorophenyl) dithiolophosphate O-(2-methoxyimino-2n-octyloxyethyl) O-(2di-n-propylamino-4,5-dichlorophenyl) O-(4-hexyloxyphenyl) phosphate O-(2-n-pentyloxyimino-2-methoxyethyl) O-(3-hexyloxy-5-fluorophenyl) O-(4-n-decylphenyl) phosphate O-(1-methyl-2-methoxyimino-2-methoxyethyl) O,O-dimethyl phosphate O-(1-allyl-2-methoxyimino-2-methoxyethyl) O-isopropyl O-phenyl phosphate O-(1-allyloxy-2-methoxyimino-2-methoxyethyl) O-methyl O-(3-methylphenyl) phosphate O-(1-pentenyloxy-2-ethoxyimino-2-methoxyethyl) O-benzyl O-phenyl phosphate O-(1-pentenylthio-2-t-butylimino-2-methoxyethyl) O-(4-t-butylphenyl) O-(4-chlorophenyl) phosphate O-[1-(3-chloro-4-nitrophenyl)-2-methoxyimino-2-methoxyethyl] O-(4-pentylsulfinylphenyl) S-(2-methoxybenzyl) thiolophosphate O-[1-(4-butylthiophenyl)-2methoxyimino-2-methoxyethyl] O-(2-pentyloxyphenyl) O-(3,4-diiodobenzyl) phosphate O-[1-(2,6-dimethoxyphenyl)-2-methoxyimino-2methoxyethyl] O-[3-(3,4-dichlorophenyl)-propyl]S-(3-nitrobenzyl) thiolothionophosphate O-(1-phenyl-2-methoxyimino-2-n-butoxyethyl) S-(4-dihexylaminophenyl) S-(3,4-dichlorophenyl) dithiolophosphate O-(1-octyl-2-ethoxyimino-2-methoxyethyl) S-(3-decyloxyphenyl) S-(4-n-butylsulfinylphenyl) dithiolophosphate S-(1-hexyloxy-2-methoxyimino-2-methoxyethyl) O-[3-(4-methylphenyl)-propyl]O-(4-bromobenzyl) thiolothionophosphate S-[1-(3-phenylpropyl)-2-methoxyimino-2-methoxyethyl] S,S-dimethyl tetrathiophosphate S-[1-(3-hexenylphenyl)-2-methoxyimino-2-methoxyethyl] S-(4-isopropylsulfonylphenyl) S-(3-methylthiophenyl) trithiolophosphate O-(1-methyl-2-methoxyimino-2-methoxyethyl) O-methyl methylphosphonate O-(1-allyl-2-methoxyimino-2-methoxyethyl) O-isopropyl phenylphosphonate O-(1-allyloxy-2-methoxyimino-2-methoxyethyl) O-methyl (3-methylphenyl) phosphonate O-(1-pentenyloxy-2-ethoxyimino-2-methoxyethyl) O-benzyl phenylphosphonate O-(1-pentenylthio-2-t-butylimino-2-methoxyethyl) O-(3-bromophenyl) benzylphosphonate O-(1-decylthio-2-methoxyimino-2-ethoxyethyl) O-(4-t-butylphenyl) (4-chlorophenyl)phosphonate O-[1-(3-chloro-4-nitrophenyl)-2-methoxyimino-2-methoxyethyl] O-(4-pentylsulfinylphenyl) (2-methoxybenzyl)phosphonate O-[1-(4-butylthiophenyl)-2-methoxyimino-2-methoxyethyl] O-(2-pentyloxyphenyl) (3,4-diiodobenzyl) phosphonate O-[1-(2,6-dimethoxyphenyl)-2-methoxyimino-2-methoxyethyl] O-[3-(3,4-dichlorophenyl)-propyl] (3-nitrobenzyl)thionophosphonate O-(1-phenyl-2-methoxyimino-2-n-butoxyethyl) S-(4-dihexylaminophenyl) (3,4-dichlorophenyl)thiolophosphonate O-(1-octyl-2-ethoxyimino-2-methoxyethyl) S-(3-decyloxyphenyl) (4-n-butylsulfinylphenyl)thiolophosphonate S-(1-hexyloxy-2-methoxyimino-2-methoxyethyl) O-[3-(4-methylphenyl)-propyl] (4-bromobenzyl)thiolothionophosphonate S-[1-(3-phenylpropyl)-2-methoxyimino-2-methoxyethyl] S-methyl methyltrithiophosphonate S-[1(3-hexenylphenyl)-2-methoxyimino-2-methoxyethyl] S-(4-isopropylsulfonylphenyl) (3-methylthiphenyl trithiophosphonate O-(1-methyl-2-methoxyimino-2-methoxyethyl)dimethylphosphinate O-(1-allyl-2-methoxyimino-2-methoxyethyl) isopropylphenylphosphinate O-(1-allyloxy-2-methoxyimino-2-methoxyethyl) (3-methylphenyl)methylphosphinate O-(1-pentenyloxy-2-ethoxyimino-2-methoxyethyl) benzylphenylphosphinate O-(1-pentenylthio-2-t-butylimino-2-methoxyethyl) (3-bromophenyl)benzylphosphinate O-(1-decylthio-2-methoxyimino-2-ethoxyethyl) (4-t-butylphenyl) (4-chlorophenyl)phosphinate S-[1-(3-chloro-4-nitrophenyl)-2 mino-2-methoxyethyl] [3-(3,4-dichlorophenyl)-propyl] (3-nitrobenzyl)thionophosphinate O-(1-phenyl-2-methoxyimino-2-n-butoxyethyl) (4-dihexylaminophenyl) (3,4-dichlorophenyl)phosphinate S-(1-octyl-2-ethoxyimino-2-methoxyethyl) (3-decyloxyphenyl) (4-n-butylsulfinylphenyl)thiolophosphinate S-(1-hexyloxy-2-methoxyimino-2-methoxyethyl) [3-(4-methylphenyl)-propyl] (4-bromobenzyl)thiolothionophosphinate S-[1-(3-phenylpropyl)-2-methoxyimino-2-methoxyethyl] dimethylthiolophosphinate S-[1-(3-hexenylphenyl)-2-methoxyimino-2-methoxyethyl] (4-isopropylsulfonylphenyl) (3-methylthiophenyl thiolophosphinate, and the like.

For practical use as nematocides, the active compounds of this invention are generally incorporated into nematocidal compositions which comprise an inert carrier and a nematocidally toxic amount of such a compound. Such compositions, which can also be called formulations, enable the active compound to be applied conveniently to the site of the nematode infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of nematocides can be dispersed under superatmospheric pressure as aerosols. However, preferred liquid nematocidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the nematode infestation. The emulsifiers most commonly used in these concentrates are nonionic or mixtures of nonionic with anionic surface-active agents. With the use of some emulsifier systems an inverted emulsion (water-in-oil) can be prepared for direct application to nematode infestations.

A typical nematocidal composition according to this invention is illustrated by the following example, in which the quantities are in parts by weight.

EXAMPLE 45

Preparation of a Dust

| | |
|---|---|
| Product of example 2 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the nematode infestation.

The compounds of this invention can be applied as nematocides in any manner recognized by the art. One method for the control of nematodes comprises contacting the locus of said nematodes with a nematocidal composition comprising an inert carrier and as an essential active ingredient, in a quantity toxic to said nematodes, a compound of the present invention. The concentration of the new compounds of this invention in the nematocidal compositions will vary greatly with the type of formulation and the purpose for which it is designed, but generally the compositions will comprise from about 0.05 to about 95 percent by weight of the active compounds of this invention. In a preferred embodiment of this invention, the nematocidal compositions will comprise from about 5 to about 75 percent by weight of the active compound. The compositions can also comprise such additional substances as other pesticides, such as insecticides, herbicides, fungicides, and the like; stabilizers, spreaders, deactivators, adhesives, stickers, fertilizers, activators, synergists, and the like.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns and rhizomes are thus more apt to be infected than aboveground parts, but infection of stems, leaves and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifest as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc method are effective, specialized methods such as row placement application, split-dosage applications, postplanting sidedress applications, and the like are also useful.

The nematocidal activity of the compounds of this invention can be shown by a variety of testing techniques known to the art. For example, in one series of tests, compounds of this invention were tested for control of the root knot nematode (*Meloidogyne spp.*) on tomato plants. The nematodes were reared by blending a part of a 2- to 3-month old culture of the nematodes with sieved soil (⅛-inch sieve) and sand in a mixer. The infested soil mixture was placed in 4-inch plastic pots and manually compacted. The compounds of the present invention were dissolved in a solvent, such as acetone containing emulsifiers, diluted with water to 100 ml. and drenched on the surface of the soil in each pot. The pots were placed in a greenhouse and held for 7 days, after which time, 10- to 14-day-old Bonny Best tomato seedlings were transplanted to the soil mixture in each pot. After at least 2 weeks, control of galls on the roots of the plants in the treated soil mixture with the number of galls on plants growing in infested, but untreated soil mixture. The results are as follows:

TABLE I

| Test Compound | Concentration of Test Compound in lbs./4" acre | % Control |
|---|---|---|
| S-(2-methoxyimino-2-methoxy-ethyl) O-ethyl N-isopropyl-thiolophosphoramidate | 40 | 92 |
| -do- | 16 | 62 |
| S-(2-methoxyimino-2-ethoxy-ethyl) O-ethyl N-isopropyl-thiolophosphoramidate | 40 | 88 |
| -do- | 16 | 61 |
| S-(2-ethoxyimino-2-methoxy-ethyl) O-ethyl N-isopropyl-thiolophosphoramidate | 40 | 100 |
| -do- | 16 | 92 |

The nematocidal activity of the compounds of the present invention was also demonstrated in another test for the control of root knot nematode on tomato plants. Nematode infested soil and sand mixture (630 ml.), prepared as described above, was placed into a plastic bag. The test solution of compounds of the present invention in acetone containing emulsifiers was prepared as above and pipetted into each bag. The solution and soil mixture in each bag was mixed and the bag placed in a incubator in the dark at 75° F. for 7 to 10 days. Thereafter the treated soil mixture was transferred to 4-inch plastic pots which were placed in a greenhouse for 7 days. The soil mixture in the pots was watered daily. After the 7-day period, 10- to 14-day-old Bonny Best tomato seedlings were transplanted to the soil mixture in each pot. The control of the root knot nematode was determined after at least 2 weeks by comparing the number of galls on the roots of the plants growing in infested and incubated, but otherwise untreated, soil mixture. The results were as follows:

TABLE II

| Test Compound | Concentration of Test Compound in lbs./4" acre | % Control |
|---|---|---|
| S-(2-methoxyimino-2-methoxy-ethyl) O-ethyl N-isopropyl-thiolophosphoramidate | 40 | 100 |
| -do- | 16 | 100 |
| S-(2-methoxyimino-2-ethoxy-ethyl) O-ethyl N-isopropyl-thiolophosphoramidate | 40 | 70 |
| -do- | 16 | 100 |
| S-(2-ethoxyimino-2-methoxy-ethyl) O-ethyl N-isopropyl-thiolophosphoramidate | 40 | 100 |
| -do- | 16 | 100 |
| S-(2-ethoxyimino-2-ethoxy-ethyl) O-ethyl N-isopropyl-thiolophosphoramidate | 40 | 66 |
| -do- | 16 | 64 |

We claim:

1. A nematocidal composition comprising an inert carrier and, as an essential active ingredient, in a quantity toxic to nematodes, a compound of the formula $$Z^1-(X^3)_m-\underset{\underset{Y}{|}}{\overset{\overset{X^1}{\|}}{P}}-X^2-CH-\underset{\underset{Z^2}{|}}{\overset{\overset{O-R^1}{|}}{C}}=N-O-R^2$$
$$\phantom{Z^1-(X^3)_m-P-X^2-CH-C}(X^4)_n$$

wherein $R^1$ and $R^2$ are lower alkyl; $X^1$, $X^2$, $X^3$ and $X^4$ are independently selected from the group consisting of oxygen and sulfur; $m$ and $n$ are each integers from 0 to 1; $Z^1$ is selected from the group consisting of lower alkyl, lower alkenyl and

[structure: phenyl ring with $A_q$ substituents, $H_{(5-q)}$, and $-(CH_2)_p-$ group]

wherein A is selected from the group consisting of lower alkyl, lower alkenyl, lower alkoxy, lower alkylthio, chlorine, bromine, nitro, lower alkylsulfoxide, lower alkylsulfone and diamino, $q$ is an integer from 0 to 5, and $p$ is an integer from 0 to 3; $Z^2$ is selected from the group consisting of hydrogen and $Z^1$, provided that when $Z^2$ is hydrogen then $n$ is 0; and Y is selected from the group consisting of lower alkyl, lower alkenyl, lower alkoxy, lower alkylthio, amino, lower alkylamino, diamino and

[structure: phenyl ring with $B_r$ substituents, $H_{(5-r)}$, and $-(Q)_t-$ group]

wherein B is selected from the group consisting of lower alkyl, lower alkenyl, lower alkoxy, lower alkylthio, chlorine, bromine, nitro, lower alkylsulfoxide, lower alkyl sulfone and diamino, $r$ is an integer from 0 to 5, Q is selected from the group consisting of oxygen, sulfur, lower alkylene, lower alkyleneoxy and lower alkylenethio, and $t$ is an integer from 0 to 1.

2. The nematocidal composition of claim 1 wherein the active ingredient is S-(2-methoxyimino-2-methoxyethyl) 0-ethyl N-isopropylthiolophosphoramidate.

3. The nematocidal composition of claim 1 wherein the active ingredient is S-(2-methoxyimino-2-ethoxyethyl) 0-ethyl N-isopropylthiolophosphoramidate.

4. The nematocidal composition of claim 1 wherein the active ingredient is S-(2-ethoxyimino-2-methoxyethyl) 0-ethyl N-isopropylthiolophosphoramidate.

5. A method for the control of nematodes which comprises contacting said nematodes, or the locus of said nematodes, with a nematocidally effective amount of the composition of claim 1.

6. A method for the control of nematodes which comprises contacting said nematodes, or the locus of said nematodes, with a nematocidally effective amount of the composition of claim 2.

7. A method for the control of nematodes which comprises contacting said nematodes, or the locus of said nematodes, with a nematocidally effective amount of the composition of claim 3.

8. A method for the control of nematodes which comprises contacting said nematodes, or the locus of said nematodes, with a nematocidally effective amount of the composition of claim 4.

* * * * *

UNITED STATES PATENT OFFICE
CERTIFICATE OF CORRECTION

Patent No. 3,622,667                     Dated November 23, 1971

Inventor(s) Sidney B. Richter and Ephraim H. Kaplan

It is certified that error appears in the above-identified patent and that said Letters Patent are hereby corrected as shown below:

In Column 3, line 22 delete "allylphenyl)"

In column 4, line 74 the "H" appearing over the third column of numerical figures should appear over the second column.

In column 10, lines 58 to 62 the part of the formula appearing as

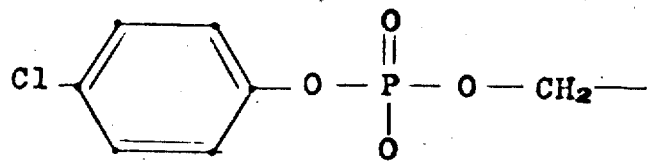

should read

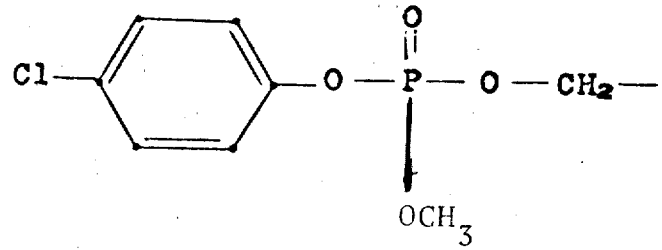

In column 13, lines 27 to 30 the part of the formula appearing as "=N—OCH$_3$" should read =N—OC$_2$H$_5$ In column 19, line 2 for "6.7" read --6.6--

UNITED STATES PATENT OFFICE
CERTIFICATE OF CORRECTION

Patent No. 3,622,667     Dated November 23, 1971

Inventor(s) Sidney B. Richter and Ephraim H. Kaplan    page - 2

It is certified that error appears in the above-identified patent and that said Letters Patent are hereby corrected as shown below:

In column 19, lines 22 to 29 the part of the formula appearing as

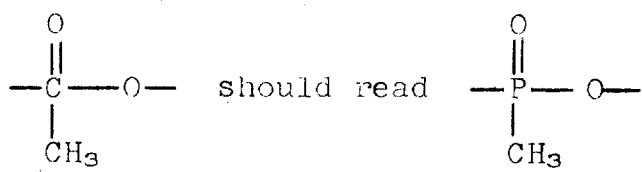

In column 29, line 27 for "diamino" read --di(lower alkyl)amino--; and in line 32 for "diamino" read --di(lower alkyl)amino--

In column 30, line 1 delete "A" and in line 4 for "diamino" read --di(lower alkyl)amino--

Signed and sealed this 4th day of July 1972.

(SEAL)
Attest:

EDWARD M. FLETCHER, JR.
Attesting Officer

ROBERT GOTTSCHALK
Commissioner of Patents